(12) United States Patent
Fox et al.

(10) Patent No.: US 6,475,377 B1
(45) Date of Patent: Nov. 5, 2002

(54) MEDIA VACUUM FILTER

(75) Inventors: Robert J. Fox, Bowling Green, OH (US); Keith K. Nelson, Toledo, OH (US)

(73) Assignee: Jorgensen Conveyors, Inc., Mequon, WI (US)

( * ) Notice: Subject to any disclaimer, the term of this patent is extended or adjusted under 35 U.S.C. 154(b) by 0 days.

(21) Appl. No.: 09/692,710

(22) Filed: Oct. 19, 2000

(51) Int. Cl.[7] .................. B01D 33/048; B01D 33/073; B01D 33/48
(52) U.S. Cl. .................. 210/90; 210/107; 210/143; 210/391; 210/387; 210/400; 210/401; 210/406
(58) Field of Search .................. 210/90, 107, 143, 210/387, 402, 400, 401, 406, 393, 391, 411

(56) References Cited

U.S. PATENT DOCUMENTS

| | | | | |
|---|---|---|---|---|
| 3,000,507 A | * | 9/1961 | Young | |
| 3,206,030 A | * | 9/1965 | Estabrook | |
| 3,363,773 A | * | 1/1968 | Glos, II | |
| 3,667,614 A | * | 6/1972 | Komline | |
| 3,826,370 A | * | 7/1974 | Ball et al. | |
| 4,008,158 A | * | 2/1977 | Davis | |
| 4,242,205 A | * | 12/1980 | Hirs | |
| 4,276,169 A | * | 6/1981 | Brown et al. | |
| 5,328,611 A | * | 7/1994 | Lenhart | |
| 5,871,643 A | * | 2/1999 | Ota | |
| 5,954,960 A | * | 9/1999 | Nagaoka et al. | |
| 6,186,340 B1 | * | 2/2001 | Hirs | |

FOREIGN PATENT DOCUMENTS

| | | |
|---|---|---|
| EP | 0 566 908 A2 | 4/1993 |
| EP | 0 943 366 A1 | 9/1999 |

* cited by examiner

Primary Examiner—Joseph W. Drodge
Assistant Examiner—Terry K Cecil
(74) Attorney, Agent, or Firm—Quarles & Brady, LLP

(57) ABSTRACT

An apparatus for removing solids from a liquid/solid mixture disposed in a tank and rising to a mixture level, the apparatus including a suction assembly defining a suction opening, the suction assembly linked to a vacuum that causes suction at the opening, a support assembly formed about the suction surface including first and second essentially circular housing walls having wall edges and a filter belt loop sealed to the edges and sized such that the belt is slack and subject to deformation between the edges, a belt section disposed to cover the suction opening and a processor controlling a motivator to periodically alter belt position with respect to the suction opening.

24 Claims, 5 Drawing Sheets

MEDIA VACUUM FILTER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to filters for use in removing solids from a solid/liquid mixture or metal working fluids and more specifically relates to a highly efficient filter assembly for use in swarf removal systems that can operate in large or small areas.

Many industries employ machining and grinding devices such as drills, mills, cutting devices, grinding wheels, etc., to remove metal pieces, chips, "strings" and other fines from work items thereby forming the work items into final products. Hereinafter removed metal material will be referred to as swarf. To remove swarf often a liquid stream is employed that is directed at the machining point and that "washes" the swarf from the machining area.

To collect the liquid for reuse a tank and conveyor are provided below the machining point. Swarf is washed into the tank and settles to the conveyor that is arranged near the bottom of the tank. Relatively heavy swarf settles quickly to the conveyor is transferred to a swarf collection bin. Smaller fines stay in suspension and eventually form a liquid/swarf mixture that is extremely "dirty". Dirty liquid cannot be used for machining or grinding purposes primarily because such liquid can clog spraying hardware, load wheels, scratch parts and cause metal working fluid degradation.

To render dirty liquid reusable most swarf handling systems include some type of filter to separate swarf from the liquid. Filtering effectiveness is extremely important as clean liquid reduces maintenance downtime, extends coolant life, improves machining precision and often extends tool life.

Many different filter configurations have been implemented. One filter configuration includes a metallic drum having small holes in the drum side wall. The drum is disposed on its side and the underside of the drum is disposed below a liquid-solid mixture level so that there is a pressure differential between the inside and outside of the drum. Liquid pours through the drum holes into the drum interior while swarf fines are stopped by the drum wall. Eventually accumulated fines form a swarf cake on the undersurface of the drum (i.e., on the submersed wall section). Liquid inside the drum is removed to maintain the differential pressure within the drum. When the holes in the underside of the drum become clogged, the drum is rotated such that an adjacent drum side faces downward and filtering continues. Pressure sensors for determining when to rotate a drum filter due to clogging are known in the art. One configuration of the above described type is described in U.S. Pat. No. 3,000,507 ("the '507 patent) entitled "Rotary Filter" that issued on Sep. 19, 1961.

Drum filters of the above described type have several shortcomings. First, after clogging, the holes must be cleared prior to reuse. Second, often the drum holes cannot be made small enough to remove very small fines. Third, such filters often require extended periods to filter the amount of liquid required. Fourth, such filters often must be substantially submersed (see the '507 patent) in order to cause a required pressure differential between the inside and outside of the drum. In addition to increasing the differential pressure, many drum filter references teach that a large portion of the drum should be submersed to increase filtering area.

The industry has developed several systems for unclogging holes or removing accumulated solids from drum filters. The '507 patent teaches a blower that blows air through drum holes from the inside of the drum thereby dislodging accumulated cake chunks and clearing the holes. A discharge chute is positioned under the discharge area so that dislodged chunks do not fall back into the tank. Unfortunately air blowers work best where drum holes are relatively large and therefore systems of this type often produce liquid that remains relatively dirty after filtering.

Another filter cleaning solution has been to provide a mechanical "cake knife" along a filter path and adjacent a filter surface that effectively scrapes cake chunks from the surface of the filter. While removing accumulated cakes from the surface of a filter drum, unfortunately this solution does little to clear swarf from filter holes or apertures.

One other filter cleaning or clearing solution that has been adopted by many in the industry is to provide a liquid sprayer that sprays the back surface of a filter with a clean liquid to knock accumulated cake chunks off the filter. Where liquid clearance systems are used, the tank typically is extended under the clearance area so that clearance liquid and cake chunks are redeposited in the tank after a clearing process. The cake chunks, being relatively heavy, settle to the bottom of the liquid tank. To remove the cake chunks from the tank, a conveyor or drag chain is placed along the bottom of the tank that drags the chunks therefrom to a point above a swarf bin where the chunks are deposited.

One other technique for loosening accumulated swarf cakes is to cause distortions in the shape of the filter media. To this end, after a cake has been formed, the cake naturally tends to maintain its compacted shape, even when the underlying filter shape is altered. Thus, when filter shape is altered, the cake often breaks into chunks and the chunks fall from the filter. U.S. Pat. No. 3,667,614 titled "Filtering Apparatus" which issued Jun. 6, 1972, teaches one configuration that relies in part on filter deformation for cake removal.

To increase filter effectiveness some configurations provide a mesh or material filter media around the drum wherein the media includes much smaller holes and tortuous paths therethrough so that even extremely small swarf bits are removed from the liquid during filtering. In these cases the filter media is typically sealed to the drum via bands adjacent the top and bottom drum ends so that swarf cannot pass into the drum without passing through the filter media. Such sealing is extremely important to ensure that only clean liquid passes through the filter.

To increase filtering speed some drum type filters increase the pressure differential between the inside and outside of the drum by removing air from within the drum to provide a vacuum therein. One patent that describes a system of this type is U.S. Pat. No. 5,954,960 ("the '960 patent") titled "Rotary Drum Type Dehydrator" which issued Sep. 21, 1999. While creation of a vacuum speeds up the filtering process, often, because air is pulled through the drum wall section that is not submersed while liquid passes through the submersed wall section, the vacuum is relatively ineffective unless a massive and, in some cases, prohibitively expensive pump is employed. The '960 patent relies in part on the presence of a built up cake on the un-submersed section of the drum to increase the vacuum effect. Nevertheless, in order to facilitate efficient filtering typically the filter media should be rotated prior to complete clogging of the media (i.e., filtering efficiency is substantially reduced prior to complete clogging). Thus, the cake that accumulates prior to drum rotation typically is insufficient to block air from entering the inside of the drum.

In addition to drum type filters other filter configurations have been developed that use a vacuum inside a filter chamber to increase filtering speed. U.S. Pat. No. 4,242,205 ("the '205 patent") teaches a filter box submersed inside a liquid-solid mixture tank wherein an upper wall of the box forms an opening and a flexible filter belt is arranged so that a portion of the belt covers the opening. The belt is periodically slid across the opening so that different filter sections cover the opening at different times and a liquid sprayer is used to clean the soiled filter sections. A vacuum is formed inside the box. In this case, because the filter box has only a single open wall a relatively small pump can be used to generate a vacuum in the box thereby increasing filtering speed.

Unfortunately, the '205 patent configuration also has several shortcomings. First, the '205 patent configuration requires a complex sealing configuration to seal the filter belt to the edges of the box about the opening. To this end the '205 patent configuration requires, among other things, two hold down chains linked to drive belt chains.

Second, the '205 patent configuration teaches a relatively complex belt path that increases hardware requirements and the space required to accommodate the configuration. Additional hardware for sealing and path configuration increase system costs appreciably.

Third, while the '205 patent configuration seal may operate properly while a vacuum is formed in the filter box, the '205 patent configuration requires that the vacuum be broken prior to movement of the filter belt. After breaking the vacuum the filter belt is slid across the filter box edges which means that the sealing pressure holding the belt to the box has to be extremely small. If the sealing pressure were large the belt would likely wear and eventually tear as the belt is slid across the box opening. However, it is believed a smaller sealing pressure that would allow the '205 patent configuration belt to slide against the opening would be insufficient to block "dirty" liquid from entering the filter box during belt movement.

Fourth, as indicated above, the '205 patent configuration also requires that at least one opening face upward. For this reason the '205 patent configuration requires that the filter be completely submersed. This limitation requires that the liquid level in the tank be at least as high as the filter box depth and some clearance thereunder for a drag chain to drag cake chunks out of the box.

Thus, there is a need for a swarf filtering configuration that removes extremely small swarf fines from liquid-solid mixtures relatively quickly, automatically replaces clogged filter media with clean media, automatically cleans clogged media and achieves all of the above goals relatively inexpensively and using hardware that is relatively small and that enables operation with a low tank liquid level.

BRIEF SUMMARY OF THE INVENTION

It has been recognized that many of the disadvantages associated with the prior art can be overcome by providing a filter loop that is sealed at opposite ends to first and second housing walls wherein the loop is oversized so that the loop is loose or slack between the walls and about a girth around a central portion of the loop and providing a suction assembly including a header within the loop wherein the suction header defines both a reduced size suction chamber and an opening that opens into the chamber where a section of the loop covers the opening and the opening is positioned within a mixture tank below the mixture level.

With a system as described above, the suction assembly increases the speed with which liquid can be filtered through the loop section adjacent the opening. It has been found that such a system can increase the liquid filtering rate to rates much higher than the rates achievable where much greater sections of a filter drum are submersed.

In addition, with the system above, where the opening faces downward, the mixture level in the tank can be relatively low and still accommodate the filter configuration. A low mixture level means the tank size can be reduced in certain applications and that less liquid is required to facilitate the machine process.

Moreover, the excess pressure caused by the reduced size suction chamber causes accumulation of tightly packed solid cakes on the filter loop that are heavier than cakes formed via other filter systems. When forced off the loop, the heavier cakes sink more readily within the tank liquid and do not disintegrate as readily in the tank prior to removal via a drag chain or conveyor.

Furthermore, by sealing the loop to the housing edges, essentially no un-filtered liquid can enter into the filter chamber. With the present invention the loop is sealed to housing wall edges during both filtering periods and loop movement periods to ensure that no dirty liquid passes into the suction chamber (or filtering chamber for that matter).

Moreover, by providing an oversized filter loop, when the vacuum is turned off so that the suction stops, the loop becomes slack adjacent the header and the filter loop can be moved with respect to the header without damaging the filter loop. Then, when the suction is again caused, the filter section adjacent the opening is sucked against the header for support. One embodiment of the header includes a support screen across the opening to support the filter loop.

The invention also includes a method wherein, with the configuration described above, with the opening below the mixture level suction is caused at the opening to begin the filtering process and after a condition related to filtering efficiency is sensed, the support housing and sealed filter are rotated until another filter loop section is adjacent the opening. Here the suction header remains stationary while the housing and loop are rotated.

With the present filter assembly filtering speed can be increased in two different ways. First vacuum suction can be increased. Second, support housing and sealed loop rotation frequency can be increased. By combining both suction and rotation frequency increases overall filtering speed is increased appreciably.

In one embodiment the invention includes a filter apparatus for separating liquid from solids in a tank, a liquid/solid mixture disposed in the tank in an amount such that the mixture rises to a mixture level within the tank and the apparatus comprises a housing formed about a chamber including first and second oppositely facing walls characterized by first and second wall edges the walls separated by at least one cross-member. The distance between the first and second walls defines a first dimension. A suction assembly includes a header forming an opening having an opening width and an opening length, the assembly supported in the chamber and juxtaposed with the tank such that the opening is below the mixture level. A filter loop has oppositely facing loop edges, the loop having first and second peripheral portions adjacent the loop edges and having a loop width between the first and second peripheral portions that is greater than the first dimension. The first and second peripheral portions are sealed against the first and second wall edges, respectively, such that the filter surrounds the chamber, a filter section is adjacent the opening, the filter width is between the walls and the filter is slack along the width dimension. A vacuum is linked to the assembly for causing suction at the opening. A motivator is provided for moving the loop with respect to the opening. A controller controls the vacuum and the motivator to periodically reduce suction at the opening and to move the loop adjacent the opening so that different loop sections cover the opening at different times.

In one aspect a belt girth length around the central portion is greater than the loop edge length. The walls may be essentially circular and the at least one crossmember includes at least first, second and third crossbars that traverse the distance between the first and second walls and may be linked to the walls adjacent the wall edges and such that the crossmembers are essentially equispaced about the periphery of each of the walls.

In one embodiment the apparatus further includes first and second bands that seal the peripheral portions to the wall edges.

The header may be characterized by a semi-cylindrical shape having a radius of curvature essentially equal to the radius of curvature of each of the walls and having a length essentially equal to the distance along a wall edge between adjacent crossmembers. The controller may control the position of the housing such that adjacent crossbars are on opposite sides of the opening whenever the suction level is increased to the second suction level.

In one embodiment the combined distances between the first and second crossmembers, the second and third crossmembers and the third and first crossmembers comprise a support dimension and the support dimension is less than the wall edge length.

In another embodiment the suction assembly includes first and second facing end plates and a media support screen that traverses the distance between the end plates, the support screen covering the opening. The suction assembly may further include guide bearings adjacent the support screen for guiding the loop therealong during movement.

In another aspect the assembly may further include a clearing assembly for removing solids deposited on the loop, the clearing assembly linked to the processor and disposed adjacent the loop along the path of loop movement from the suction assembly, the controller controlling the clearing assembly to periodically disturb the solids deposited on a loop section adjacent the clearing assembly. One advantageous clearing assembly is a spray assembly comprising a liquid source linked to a spray nozzle, the nozzle disposed adjacent the loop and inside the chamber, the controller controlling the spray assembly to periodically spray liquid toward an adjacent loop section to disturb solids deposited thereon.

In another embodiment a sensor is linked to the processor for determining and indicating when at least one condition related to filtering efficiency has occurred, and when the at least one condition has occurred, the processor causes the motivator to move the loop with respect to the opening. The sensor may sense vacuum pressure.

In yet one more embodiment the configuration includes a disposable filter assembly including a support assembly, a filter ribbon, and a second motivator, the support assembly supporting a ribbon section adjacent the header on a side of the loop section adjacent the header opposite the header, the second motivator linked to the ribbon for moving the ribbon with respect to the header so that different ribbon sections are adjacent the header at different times, the controller linked to the second motivator for periodically moving the ribbon, a used end of the ribbon fed into a disposal bin.

In addition to a complete filtering system the invention also includes a filter apparatus for use with a filter assembly, the assembly including a filter housing having first and second oppositely facing walls and at least one crossbar therebetween, the first and second walls having first and second edges, each edge characterized by a peripheral housing length, the distance between the housing edges defining a housing width, the filter apparatus comprising a flexible filter loop characterized by a loop width between oppositely facing first and second loop edges, each of the first and second loop edges characterized by a peripheral loop length, the peripheral loop lengths each essentially the same length as the peripheral housing lengths, the belt having a girth length about a central portion of the belt between the first and second loop edges that is greater than the peripheral loop length and having a width between the first and second loop edges that is greater than the housing width such that when the first and second loop edges are sealed to the first and second housing member edges the loop is slack between the first and second housing member edges and around the central belt portion.

The filter apparatus is also for use with a suction assembly and a vacuum, the suction assembly disposed inside the filter housing, the suction assembly including a header that defines a suction opening, the vacuum linked to the header for creating suction at the opening, the loop length and width such that a loop section adjacent the opening is slack when the vacuum is off and is sucked up against the header when the vacuum is on.

The invention further includes an apparatus for supporting a flexible filter belt loop, the loop characterized by a loop width between oppositely facing first and second loop edges. In this regard the support apparatus includes first and second oppositely facing housing walls characterized by first and second peripheral edges, respectively, each edge characterized by a peripheral housing length and formed so that one of the loop edges is sealable thereto and at least one crossmember linked to and between the first and second walls such that the distance between the housing edges defines a housing width, the crossmember having a cross sectional area substantially less than the surface area of each of the first and second walls. In one such embodiment each of the walls is essentially circular and the at least one crossmember includes first, second and third crossmembers that traverse the distance between the walls, the crossmembers linked to the walls adjacent the wall edges and equispaced about the edge peripheries.

The invention further includes a filter apparatus for separating liquid from solids in a tank, a liquid/solid mixture disposed in the tank in an amount such that the mixture rises to a mixture level within the tank, the apparatus comprising: a housing formed about a filter chamber including first and second oppositely facing walls having by first and second wall edges, respectively, the walls separated by at least one crossmember, the filter chamber having a first volume; a suction assembly including a header forming a suction chamber having a second volume that is substantially less than the first volume, the header forming an opening that opens into the suction chamber, the assembly supported in the chamber and juxtaposed with the tank such that the opening is below the mixture level; a filter loop having oppositely facing loop edges, the loop having first and second peripheral portions adjacent the loop edges, the first and second peripheral portions sealed against the first and second wall edges, respectively; a vacuum linked to the assembly for causing suction at the opening; a motivator for moving the loop with respect to the opening and a controller for controlling the vacuum and the motivator to periodically reduce the suction at the opening from the second to the first suction level and move the loop adjacent the opening so that different loop sections cover the opening at different times.

Thus, it has also been recognized that while a small suction chamber limits the amount of filter loop used at any given time for filtering purposes, a small suction chamber results in greater suction through the used filter section such that the overall amount of liquid filtered in a given period can be increased appreciably. Because filtering speed is increased the amount of cooling liquid required, reduces tank size, can in fact increase filtering speed, etc.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Nothing in this application is considered critical or essential to the present invention unless explicitly indicated as being "critical" or "essential".

A. Hardware Configuration

Figure 1:
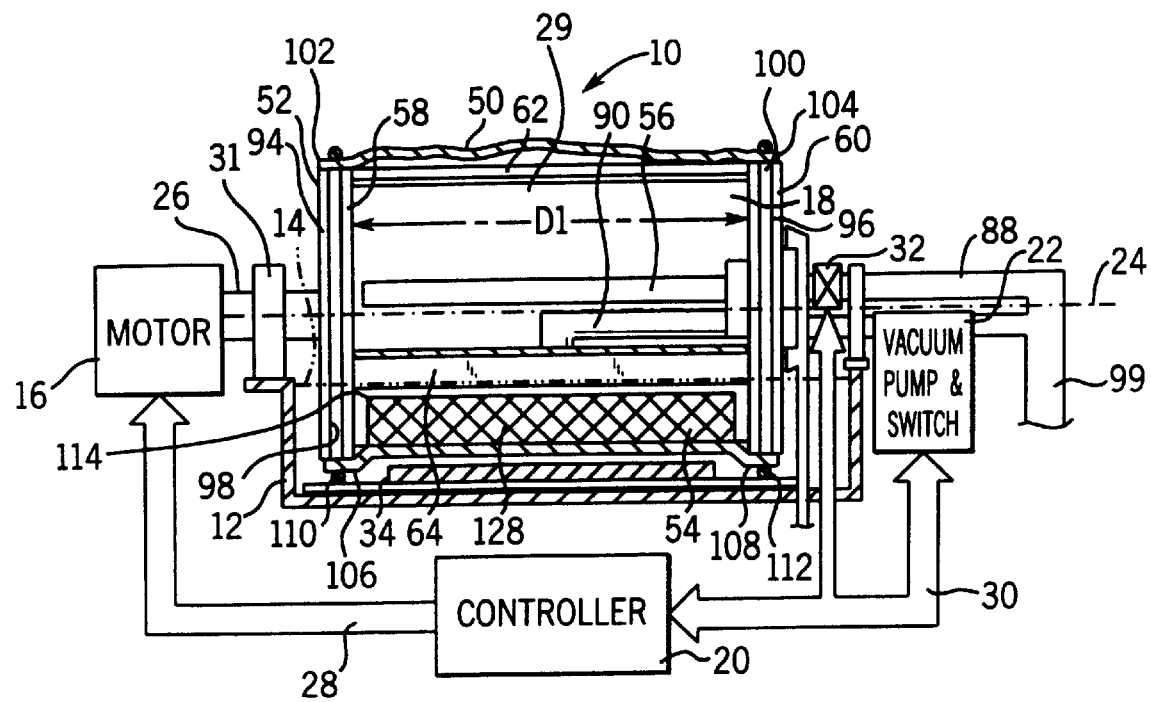
FIG. 1 is a partial cross-sectional view of a filter assembly according to the present invention.
Figure 2:
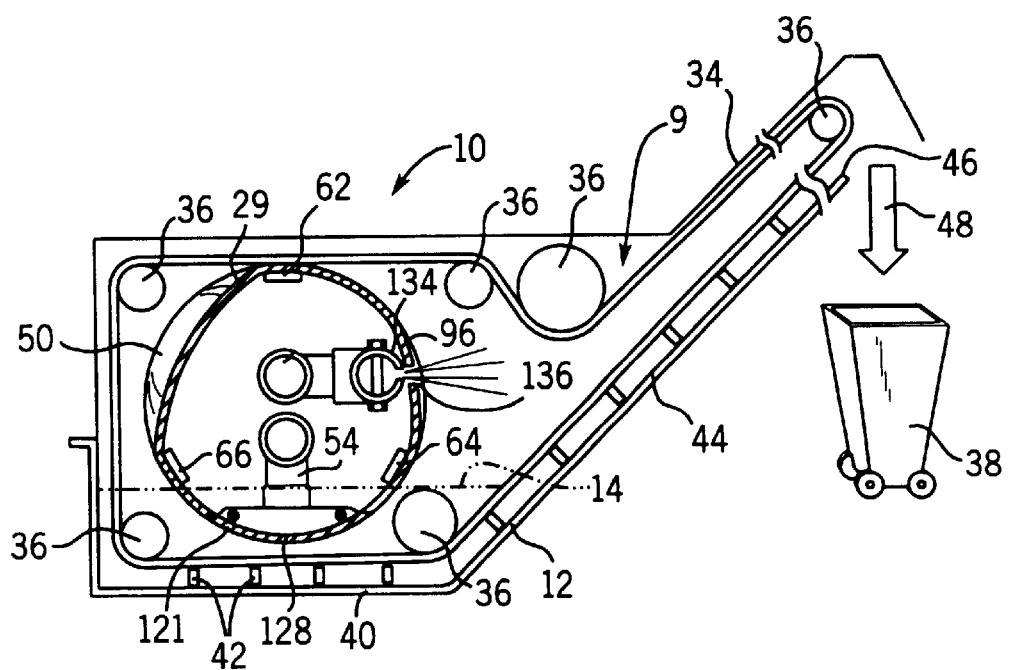
FIG. 2 is a partial cross-sectional view of the filter assembly of FIG. 1 juxtaposed with respect to a material conveyor.

Referring now to FIGS. 1 and 2, the present invention will be described in the context of the exemplary liquid/solid mixture cleaning system 10. Although not illustrated, it is contemplated that system 10 is useable in a conventional liquid cleaning system including a swarf conveyor (not illustrated) the swarf and liquid fall under the force of gravity into a tank 12. In FIGS. 1 and 2 the mixture rises to a mixture level 14. The mixture is maintained essentially at level 14 by regulating a filtering rate as described in more detail below. As best seen in FIG. 2, tank 12 includes, among other walls, a bottom wall 40 and a sloped side wall 44 that extends up to a tank egress 46.

In addition to tank 12, system 10 includes a motor 16, a filter assembly 18, a controller 20, a vacuum pump and switch 22, a drag conveyor system 9, a waste or collection bin 38 and a plurality of control buses and other linkage devices described in more detail below. Filter assembly 18 is a "pseudo-drum" type filter assembly supported and mounted for rotation about a rotation axis 24. The phrase pseudo-drum is used to describe assembly 18 as parts of assembly 18 are similar to parts that may be employed in a conventional drum filter while other important parts of assembly 18 are unique to assembly 18.

During operation of system 10, periodically a drum portion of assembly 18 is rotated about axis 24 to improve the filtering characteristics of the system 10. To rotate the drum portion of assembly 18, assembly 18 is linked via a drive shaft 26 to motor 16. Controller 20 is linked to motor 16 via a bus 28 to provide control signals thereto.

Vacuum pump 22 is linked to a suction assembly that resides inside filter assembly 18 and that will be described in more detail below. Vacuum pump 22 is linked to controller 20 via a bus 30 so that controller 20 also controls vacuum pump 22. Pump 22 includes a vacuum switch (not separately illustrated) that trips upon the occurrence of a programmed event related to the condition of filter assembly 18. For example, the vacuum switch inside pump 22 may trip when the filter assembly becomes clogged such that filtering efficiency is reduced to a level below a threshold level associated with relatively efficient filtering. When the vacuum switch trips, pump 22 sends a signal to controller 20 via bus 30 indicating the inefficient filtering condition.

In addition to being linked to motor 16 and pump 22, controller 20 is also linked to a spray assembly valve 32 via bus 30 to open and close valve 32. While controller 20 may be constructed via electronic hardware, preferably, controller 20 includes a microprocessor that can be programmed and reprogrammed to modify a filtering method such that the method caused is specifically suited to the conditions of the filtering environment. For example, drum rotation frequency may be altered, spray frequency may be altered, rotation speed may be altered and so on.

Drag conveyor system 9 includes a belt 34 having spaced drag extensions 42. Belt 34 is supported by a plurality of rollers 36 and is positioned adjacent bottom wall 40 and sloped wall 44 such that extensions 42 pass very close to walls 40 and 44 to move swarf chunks therealong. As swarf drops into tank 12, solid swarf particles and cakes sink to the bottom of tank 12 and gather adjacent lower wall 40. Conveyor belt 34 is guided along lower wall 40 and extensions 42 "drag" swarf along wall 40 and up inclined wall 44 to egress 46 high above mixture level 14. As the swarf is conveyed up wall 44, liquid on the swarf drips off until, at egress 46, essentially all liquid has dripped off the swarf. At egress 46, as conveyor belt 34 passes, the solid swarf falls via the force of gravity along the direction indicated by arrow 48 into bin 38 therebelow. When bin 38 is completely filled, bin 38 is removed and replaced by an empty bin. Conveyor belt 34 may be moved either continuously or in a sequence calculated to facilitate more efficient mixture cleaning.

Referring still to FIGS. 1 and 2, support assembly 52 includes first and second oppositely facing circular housing walls 58 and 60, respectively, and, in the embodiment illustrated, first, second and third cross-members or crossbars 62, 64 and 66. Wall 58 is rigid and is characterized by a circular peripheral edge 94. An annular recess 98 is formed in edge 94 around the entire wall periphery that cooperates with a sealing band 110 to seal loop filter 50 thereto when assembly 10 is configured for operation. Similarly, wall 60 is rigid and is characterized by a circular peripheral edge 96 that forms an annular recess 100 that cooperates with a second sealing band 112 to seal loop filter 50 thereto. Each of edges 94 and 96 has an identical length referred to herein as a wall edge length.

Figure 3:
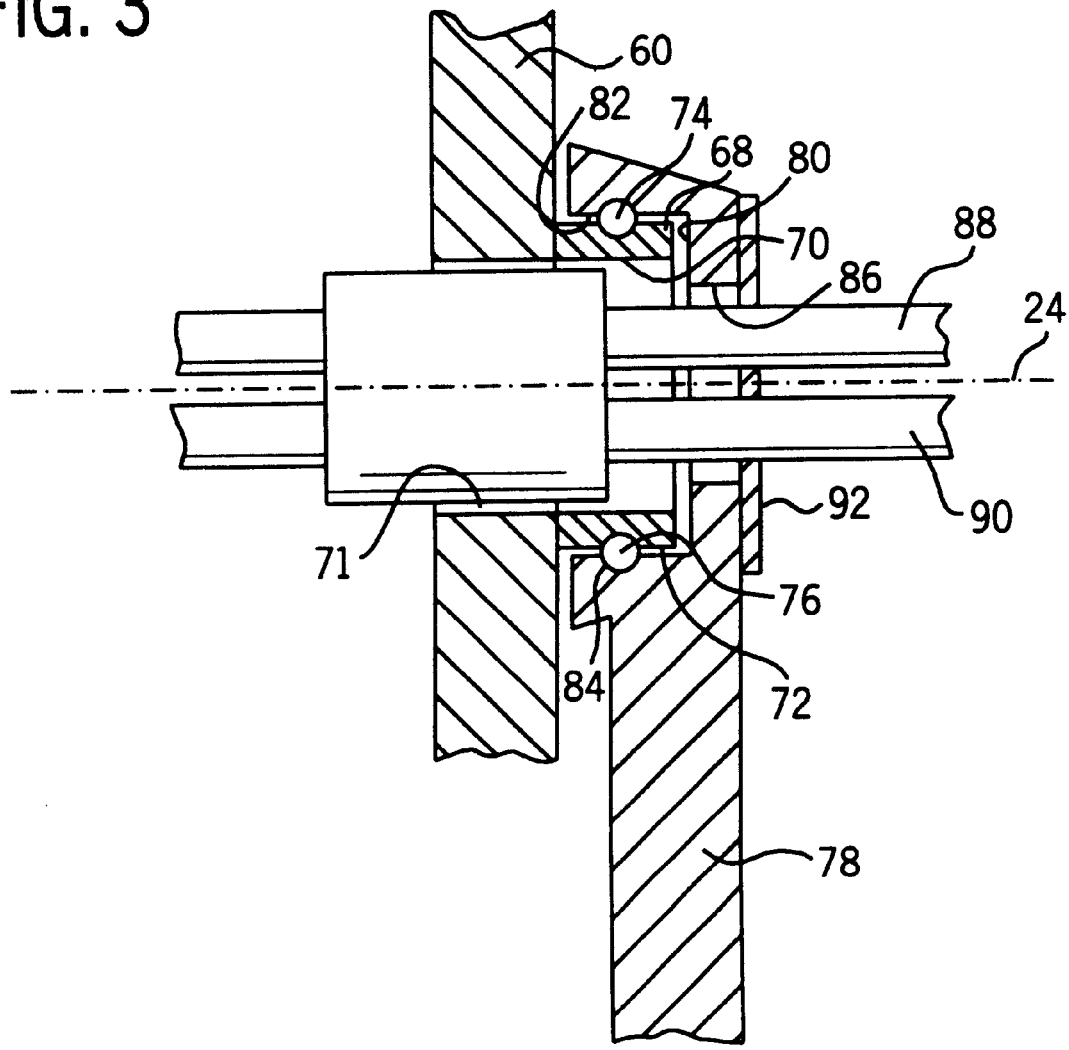
FIG. 3 is a partial cross-sectional view of the housing support in FIG. 1.

A central portion of wall 58 is integrally secured to shaft 26 which is in turn supported by a bearing 31 for rotation about axis 24. Wall 58 is centrally linked to shaft 26 and turns therewith. Referring also to FIG. 3, an annular extending member 68 extends from a central portion of wall 60 in the direction opposite wall 58 and forms an annular channel 70 therethrough that is aligned with a central opening 71 in wall 60. An external surface 72 of extending member 68 forms a ball-bearing receiving recess 74 which supports a ball-bearing 76.

A drum support 78 extending from a support surface (e.g., a floor, not illustrated) forms a hub 80 for receiving extending member 68. An internal surface 82 of hub 80 forms an annular recess 84 facing recess 74 that also receives ball-bearing 76 thereby supporting member 68 and housing end 60 for rotation about axis 24. Support 78 forms an opening 86 through which vacuum and spray pipes 88, 90, respectively, extend, pipes 88 and 90 continuing through channel 70 and opening 71 into a filter chamber 29 between walls 58 and 60. Pipes 88 and 90 are both linked to a reservoir pipe 99 that is pressurized so that when valve 32 is opened liquid is provided to pipe 88. An elastomeric seal 92 hermetically seals the space between the surface defining opening 86 and the external surfaces of pipes 88 and 90 in any manner well known in the industry.

Each of cross-bars 62, 64 and 66 is rigidly secured to walls 58 and 60 at opposite bar ends. Thus, walls 58 and 60 rotate in unison and walls 58 and 60 together with bars 62, 64 and 66 form a pseudo-drum support assembly 52. Support assembly 52 is a pseudo-drum in that the space between walls 58 and 60 is drum-shaped (i.e., cylindrical) but there are no side walls per se. As best illustrated in FIG. 2, cross-bars 62, 64 and 66 are equispaced about the circumferential edges 94 and 96 of walls 58 and 60. Thus, because there are three cross-bars 62, 64 and 66, the cross-bars are separated by essentially 120° with respect to axis 24. The space between walls 58 and 60 is referred to as a filter chamber hereinafter.

Referring still to FIGS. 1 and 2, filter loop 50 is formed of a flexible woven or perforated media such as a fibrous material that can be wrapped around the support assembly 52. Exemplary filter loop materials include polyester, polypropylene, nylon and stainless steel mesh. Loop 50 has oppositely facing loop edges 102 and 104 and has peripheral portions 106 and 108 adjacent the loop edges 102, 104, respectively. Each loop edge 102, 104 is essentially the same length as each of the wall edge lengths (e.g., 94, 96) described above.

When filter assembly 18 is assembled the peripheral portions 106 and 108 of loop 50 are sealed against wall edges 94 and 96. To this end, peripheral portions 106 and 108 are positioned such that internal surfaces of portions 106 and 108 are adjacent edges 94 and 96, respectively, and first and second sealing bands 110 and 112 are secured around the peripheral portions 106 and 108. Bands 110 and 112 preferably force the peripheral portions 106 and 108 into recesses 98 and 100 thereby creating a robust seal. Bands 110 and 112 may be mechanically tightened or may rely on band elasticity (e.g., the bands may be elastomeric).

Referring still to FIGS. 1 and 2, importantly, filter loop 50 is sized such hat the loop dimension between sealed peripheral portions 106 and 108 is greater than the dimension D1 defined by walls 58 and 60. Thus, as seen in each of FIGS. 1 and 2, filter loop 50 is "slack" or "loose" between walls 58 and 60. In FIG. 1, loop 50 is shown as being slack above cross-bar 62 and in FIG. 2 loop 50 is illustrated as being slack between bars 62 and 60 and also between bars 62 and 64. The slack nature of filter loop 50 facilitates filter support by a suction assembly 54 as will be explained in more detail below. At this point it should suffice to say that suction assembly 54 is juxtaposed within filter chamber 29 and between adjacent cross-bars (e.g., 64 and 66) such that a mesh support wall (see 128 in FIG. 5) is recessed back from a surface defined by adjacent edge portions of walls 58 and 60 and the loop 50 dimension between walls 58 and 60 is large enough that the loop section adjacent wall 128 is capable of caving into filter chamber 29 until the adjacent loop section is supported by wall 128.

Figure 4:
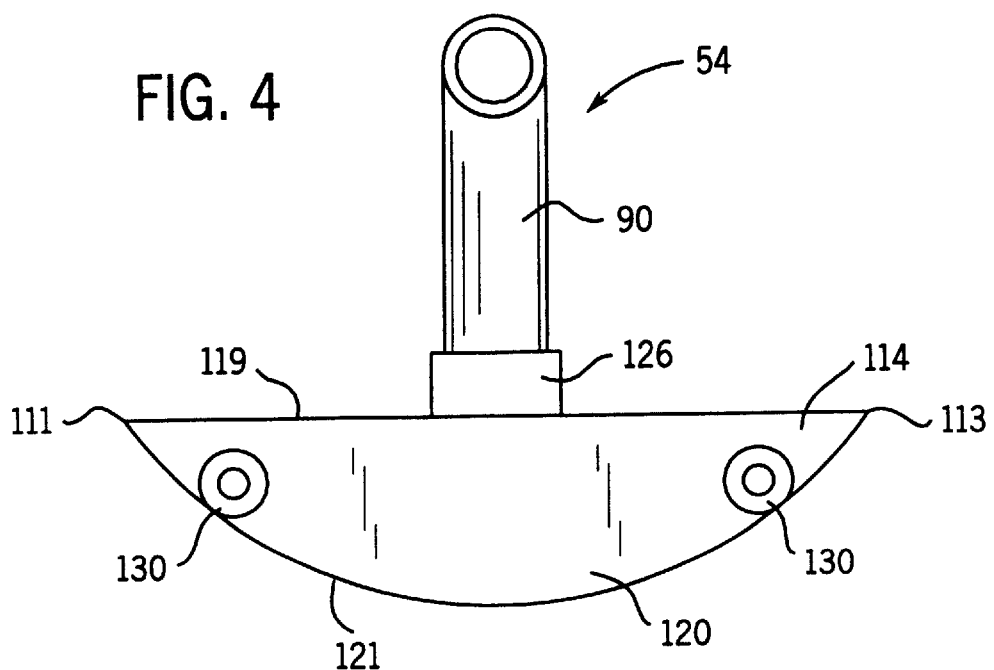
FIG. 4 is a side perspective view of the suction header of FIG. 2.
Figure 5:
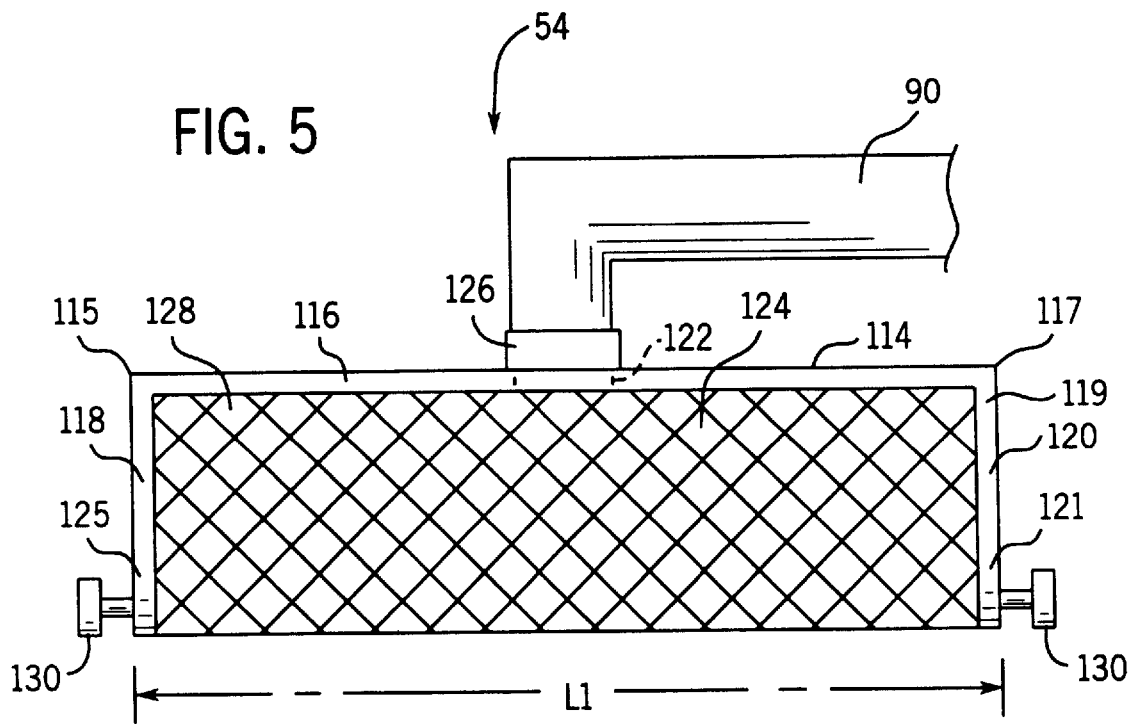
FIG. 5 is a side elevational view of the suction header of FIG. 4.

Referring still to FIGS. 1 and 2 and also to FIGS. 4 and 5, suction assembly 54 includes a suction header 114 that is linked to vacuum pump 22 via suction pipe 90. In the embodiment illustrated, header 114 includes a base plate 116 and first and second ends plates 118 and 120. Base plate 116 is rectangular having oppositely facing edges 111 and 113 and oppositely facing edges 115 and 117 and having a length L1 between edges 115 and 117 that is essentially the same length as dimension D1 between first and second housing walls 58 and 60 (see FIG. 1). Base plate 116 forms a centrally located opening 122. An annular extension 126 is formed about opening 122 and extends to a side of base plate 116 opposite end plates 118 and 120. Although not illustrated, extension 126 forms an annular passageway that may be threaded so as to receive an adjacent end of suction pipe 90. In any event, pipe 90 is integrally secured to annular extension 126.

End plate 120, as best illustrated in FIG. 4, has a straight edge 119 and a curved edge 121 that connects the opposite ends of the straight edge 119. Similarly end plate 118 has a straight edge (not separately numbered) and a curved edge 125. In the embodiment illustrated, the degree of curvature of curved edges 121 and 125 is similar to the degree of curvature of the wall edges 94 and 96. The similarity in the degree of curvature between edges 121 and 125 and wall edges 94 and 96 is best illustrated in FIG. 2. The radius of curvature of edges 121 and 125 is slightly smaller than the radius of curvature of wall edges 94 and 96. Referring still to FIGS. 4 and 5, the flat edges (e.g., 119) of end plates 118 and 120 are secured to opposite edges of base plate 116 at opposite ends of length L1.

Referring still to FIGS. 4 and 5, rigid mesh wall 128 traverses the distance between curved edges 121 and 125 having essentially the same radius of curvature as each of curved edges 121 and 125 and also traverses the distance between base plate edges 111 and 113. Mesh wall 128, base plate 116 and end plates 118 and 120 together define a semi-cylindrical suction chamber 124. As illustrated in FIG. 5 central opening 122 through base plate 116 opens into suction chamber 124. Thus, it should be appreciated that header 114 forms a suction opening covered by mesh wall 128 which has a length essentially equal to length L1 and has an opening width dimension that is essentially the same length as curved edges 125 and 121.

Referring still to FIGS. 4 and 5, four guide bearings collectively referred to by numeral 130 extend from external surfaces of end plates 118 and 120. Bearings 130 help to reduce friction between filter loop 50 and an external surface of mesh wall 128 when loop 50 is rotated with respect thereto.

Referring now to FIGS. 1, 2, 4 and 5, suction assembly 54 is mounted within filter chamber 29 so that mesh wall 128 faces downward and so that mesh wall 128 is recessed slightly back from each of walls edges 94 and 96 (i.e., wall 128 is recessed from an imaginary surface corresponding to edges 94 and 96). In the embodiment illustrated, suction assembly 54 is rigidly mounted such that the suction assembly 54 does not move when motor 16 causes the support assembly 52 and filter loop 50 to rotate about axis 24.

With suction assembly 54 mounted inside filter chamber 29 and a "slack" filter loop 50 as described above, when vacuum pump 22 is turned on the loop 50 section adjacent mesh wall 128 (i.e., adjacent the opening formed by suction header 114) is sucked up against the external surface of mesh wall 128 such that the adjacent loop section is supported by the mesh wall for filtering purposes. Similarly when vacuum pump 22 is turned off, because loop 50 is "slack," the loop section adjacent mesh wall 128 separates from the external surface of wall 128 and hangs in a slack manner. Because there is minimal friction between the loop 50 and mesh wall 128 after pump 22 or flow is turned off, support assembly 52 and filter loop 50 can be rotated about axis 24 without damaging the filter loop 50.

Referring now to FIGS. 1 and 2, spray assembly 56 includes spray control valve 32 positioned within spray pipe 88 and a spray header 134 linked to spray pipe 88 within filter chamber 29. Spray header 134 is positioned within chamber 29 and forms a spray nozzle 136 that directs clean liquid at a back surface of loop 50 between two of the three support assembly cross-bars. For example, in FIG. 2, nozzle 136 is positioned within chamber 29 such that the spray generated by assembly 56 is directed at a section of filter loop 50 between cross-bars 62 and 64. In FIG. 2 it is contemplated that loop 50 rotates in a counter-clockwise direction so that, after a partial rotation of loop 50, the loop section initially adjacent suction assembly 54 is adjacent spray nozzle 136. Referring still to FIGS. 1 and 2, when valve 32 is opened, clean liquid is provided to header 134 and is directed at loop 50 to knock swarf cakes therefrom.

B. Operation

Figure 6:
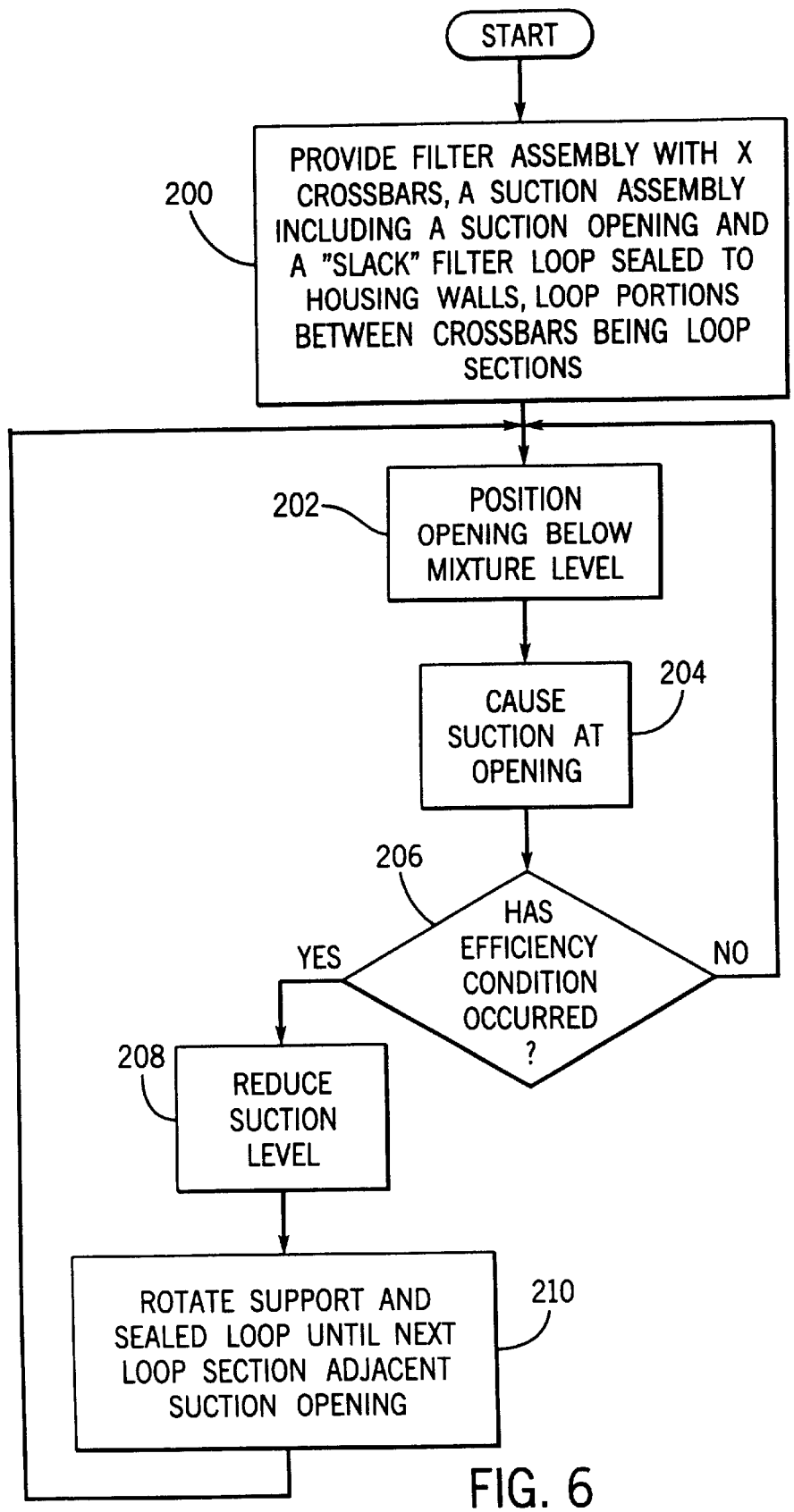
FIG. 6 is a flow chart illustrating a method according to the present invention.

Referring now to FIG. 6 a method according to the present invention is illustrated. Referring also to FIGS. 1 and 2, beginning at block 200 a filter assembly is provided that includes X crossbars 62, 64, 66, between housing end walls 58 and 60, a suction assembly 54 positioned within the filter chamber 29 and a "slack" filter loop 50 sealed to the housing wall edges 94 and 96 where the loop portions between adjacent crossbars are loop sections.

At block 202 the suction opening (e.g., wall 128 in FIG. 5) is positioned within tank 12 below mixture level 14. At this point, with vacuum 22 off, the filter loop section adjacent wall 128 is slack so that there is little pressure between the surface of loop 50 facing wall 128 and wall 128. Where loop 50 is formed of a buoyant material (e.g., a fabric), there may be some pressure between loop 50 and wall 128 as the loop tends to rise within the mixture tank 12. Nevertheless, the pressure from a buoyant material is so minimal that loop damage is unlikely. Thus, with vacuum 22 off, support assembly 52 and sealed loop 50 can be rotated about axis 42 without risking damage to loop 50.

Continuing, at block 204 vacuum pump 22 is turned on to cause suction through mesh wall 128. The suction at wall 128 causes the loop section adjacent wall 128 to be sucked up against wall 128.

Referring still to FIGS. 1, 2 and 6, at block 206 the switch associated with pump 22 monitors vacuum pressure (i.e., monitors some condition related to filtering efficiency).

When the vacuum pressure remains below a pre-set pressure level corresponding to an acceptable efficiency rating the vacuum switch remains set and control loops back to block 204. However, when vacuum pressure exceeds the pre-set threshold level the vacuum switch is tripped and controller 20 receives a signal therefrom. When controller 20 receives the "tripped" signal, control passes to block 208 where vacuum pump 22 pressure is reduced. In one embodiment pump 22 is turned off. At block 210, after a vacuum reduction period, controller 20 causes motor 26 to rotate support assembly 52 and sealed loop 50 in a counter-clockwise direction until the next loop section (i.e., in FIG. 2, the section between bars 62 and 60) is adjacent wall 128 and the section originally adjacent wall 128 (i.e., the section) between bars 66 and 64) is adjacent spray header 134.

Next, control passes again to block 204 where controller 20 causes pump 22 to increase suction at wall 128 thereby sucking the loop section adjacent wall 128 against wall 128. This process of providing suction at wall 128, sensing an inefficient filter condition, reducing suction, rotating the support assembly 52 and sealed filter loop 50 and then again providing suction continues. Spray assembly 56 may be controlled to either continuously spray the back surface of loop 50 or to be sequenced with loop rotation. These and other spraying sequences are contemplated.

It should be appreciated that suction chamber 124 (see FIG. 5) has a much smaller volume than drum filter chamber 29 (see FIG. 1) and therefore that a relatively small pump 22 can be used to cause a relatively large suction through the loop section adjacent wall 128. In fact, despite the relatively small portion of loop 50 used to filter at any one time, it has been found that the increased suction can nevertheless increase filtering speed appreciably.

It should be appreciated that the suction caused by pump 22 increases swarf cake density/compactness thereby forming heavier and more robust cake chunks that, upon being dislodged from the loop, sink more readily to wall 40 where they are dragged out of tank 12 via belt 34.

Moreover, referring to FIG. 2, it should be appreciated that as loop 50 rotates and becomes deformed adjacent spray header 134, swarf chunks break apart due to the deformation and drop back into tank 12. This deformation, in conjunction with the spray from header 134 virtually ensures that loop sections returning to positions adjacent wall 128 are clean and ready to facilitate efficient filtering.

One other advantage of the present invention is that filter loop replacement is relatively easy. The slack nature of the filter loop makes removal of old loops and replacement with new loops relatively easy.

It should be understood that the methods and apparatuses described above are only exemplary and do not limit the scope of the invention, and that various modifications could be made by those skilled in the art that would fall under the scope of the invention. For example, while the invention is described above as including a filter loop that is essentially the same girth around every part of the loop, other loop configurations are contemplated that provide even more loop slack. For example, in one embodiment where peripheral loop edge lengths are equal and a central loop portion is between the loop edges, a girth length around the central portion may be greater than the edge lengths.

In addition, while the invention is described as including alternating periods during which a vacuum is turned on and off, instead, the vacuum pressure may simply be changed between a high filtering pressure and a relatively low pressure selected to avoid loop damage during rotation.

Moreover, more or less than three crossbars may be employed, the suction wall may be larger or smaller than the dimension between adjacent crossbars, the mesh wall may be other than semi-cylindrical (e.g. may be flat), the controller may identify some characteristics other than vacuum suction level (e.g., time) prior to reducing suction and causing rotation and some assembly (e.g., a mechanical cleaning knife, air knife, etc.) may be used to clean swarf cakes from loop 50.

Figure 7:
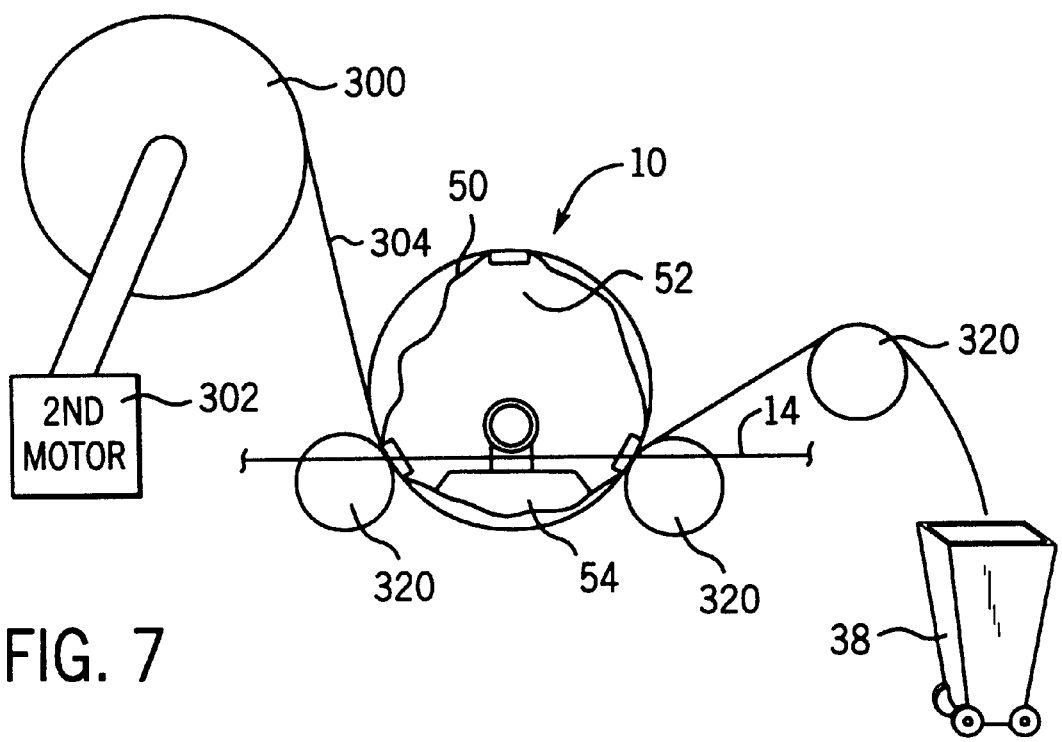
FIG. 7 is a schematic of a system including a disposable belt assembly.

Furthermore, the present invention can also be used in conjunction with a disposable filter belt to either routinely or periodically clean the mixture in a tank. For instance, in FIG. 7, a role of filter media 300 is linked to a second motivator or motor 302 to provide a secondary filter belt 304 in conjunction with simplified assembly 10. In this embodiment support assembly 52, loop 50, bin 38 and suction assembly 54 are essentially identical to similarly marked components above and hence will not be explained again here in detail. The distinction in FIG. 7 is that secondary belt 304 is juxtaposed adjacent header 114 on a side of loop 50 opposite header 114. Thus, when suction is provided at header 114, liquid is drawn through belt 304 and loop 50 thereby filtering the liquid twice. Belt 304 is held in place via a support assembly generally identified by numeral 320. After the swarf cake on belt 304 reduces filtering efficiency support 52 and sealed loop 50 are rotated such that the belt section adjacent header 114 moves toward bin 38 where the used/dirty belt is deposited.

To apprise the public of the scope of this invention, the following claims are made.

What is claimed is:

1. A filter apparatus for separating liquid from solids in a tank, a liquid/solid mixture disposed in the tank in an amount such that the mixture rises to a mixture level within the tank, the apparatus comprising:

a housing formed about a chamber including first and second oppositely facing walls characterized by first and second wall edges, the walls separated by at least one crossmember and the distance between the first and second walls defining a first dimension;

a suction assembly including a single stationary header forming an opening having an opening width and an opening length, the assembly supported in the chamber and juxtaposed with the tank such that the opening is below the mixture level at all times;

a filter loop having oppositely facing loop edges, the loop having first and second peripheral portions adjacent the loop edges and having a width between the first and second peripheral portions that is greater than the first dimension, the first and second peripheral portions sealed against the first and second wall edges, respectively, such that the filter surrounds the chamber, a filter width dimension is between the walls and the filter is slack along the width dimension such that when a vacuum is applied to said chamber, a portion of said filter loop contacts said header to cover the opening thereof and when a vacuum is not applied, the filter loop portion is substantially spaced from said header;

a vacuum linked to the assembly for causing suction at the opening;

a motivator for moving the loop with respect to the opening; and a controller for controlling the vacuum and the motivator to periodically reduce the suction at the opening and to move the loop adjacent the opening so that different loop sections cover the opening at different times.

2. The apparatus of claim 1 wherein the suction assembly includes first and second facing end plates and a support screen that traverses the distance between the end plates, the support screen covering the opening.

3. The apparatus of claim 2 wherein the suction assembly further includes guide bearings adjacent the support screen for guiding the loop therealong during movement.

4. The apparatus of claim 3 further comprising a drag assembly including a drag belt and a second motivator linked to the belt for moving the belt from a position below the loop to a position above a disposal bin.

5. The apparatus of claim 1 further including a clearing assembly for removing solids deposited on the loop, the clearing assembly linked to the controller and disposed adjacent the loop along the path of loop movement from the suction assembly, the controller controlling the clearing assembly to periodically disturb the solids deposited on a loop section adjacent the clearing assembly.

6. The apparatus of claim 5 wherein the clearing assembly is a spray assembly comprising a liquid source linked to a spray nozzle, the nozzle disposed adjacent the loop and inside the chamber, the controller controlling the spray assembly to periodically spray liquid toward an adjacent loop section to disturb solids deposited thereon.

7. The apparatus of claim 1 further including a sensor linked to the controller for determining and indicating when at least one condition related to filtering efficiency has occurred, when the at least one condition has occurred, the controller causing the motivator to move the loop with respect to the opening.

8. The apparatus of claim 7 wherein the sensor senses vacuum pressure.

9. The apparatus of claim 1 further including a disposable filter assembly including a support assembly, a filter ribbon, and a second motivator, the support assembly supporting a ribbon section adjacent the header on a side of the loop section adjacent the header opposite the header, the second motivator linked to the ribbon for moving the ribbon with respect to the header so that different ribbon sections are adjacent the header at different times, the controller linked to the second motivator for periodically moving the ribbon, a used end of the ribbon fed into a disposal bin.

10. The apparatus of claim 1 wherein the first and second peripheral portions of the loop are completely sealed to the first and second wall edges, respectively.

11. The apparatus of claim 10 further including first and second bands secure the first and second peripheral portions of the loop to the first and second wall edges.

12. A filter apparatus for separating liquid from solids in a tank, a liquid/solid mixture disposed in the tank in an amount such that the mixture rises to a mixture level within the tank, the apparatus comprising:

a housing formed about a chamber including first and second oppositely facing walls characterized by first and second wall edges, the walls separated by at least one crossmember and the distance between the first and second walls defining a first dimension;

a suction assembly including a header forming an opening having an opening width and an opening length, the assembly supported in the chamber and juxtaposed with the tank such that the opening is below the mixture level;

a filter loop having oppositely facing loop edges, the loop having first and second peripheral portions adjacent the loop edges and having a width between the first and second peripheral portions that is greater than the first dimension, the first and second peripheral portions sealed against the first and second wall edges, respectively, such that the filter surrounds the chamber, a filter section is adjacent the opening, the filter width is between the walls and the filter is slack along the width dimension;

a vacuum linked to the assembly for causing suction at the opening;

a motivator for moving the loop with respect to the opening;

a controller for controlling the vacuum and the motivator to periodically reduce the suction at the opening and to move the loop adjacent the opening so that different loop sections cover the opening at different times; and wherein each wall edge is characterized by a wall edge length, the loop edges are characterized by loop edge lengths that are essentially the same length as the wall edge lengths, the loop includes a central loop portion between the loop peripheral portions and a belt girth length around the central portion is greater than the loop edge lengths.

13. The apparatus of claim 12 wherein the loop width and the girth lengths are sized such that when the suction is reduced the loop section adjacent the opening is slack.

14. The apparatus of claim 13 wherein the walls are essentially circular and the at least one crossmember includes at least first, second and third crossbars that traverse the distance between the first and second walls and are linked to the walls adjacent the wall edges and such that the crossmembers are essentially equispaced about the periphery of each of the walls.

15. The apparatus of claim 14 wherein the apparatus further includes first and second bands that seal the peripheral portions to the wall edges.

16. The apparatus of claim 15 wherein the header is characterized by a semi-cylindrical shape having a radius of curvature essentially equal to the radius of curvature of each of the walls and having a width essentially equal to the distance along a wall edge between adjacent cross-members.

17. The apparatus of claim 16 wherein the controller controls the position of the housing such that adjacent crossbars are on opposite sides of the opening whenever the suction level is increased.

18. A filter apparatus comprising a filter assembly, the assembly including a filter housing having first and second oppositely facing walls and at least one crossbar therebetween, the first and second walls having first and second wall edges, respectively, each wall edge characterized by a wall edge length, the distance between the walls defining a housing width, the filter apparatus comprising:

a flexible filter loop characterized by a loop width between oppositely facing first and second loop edges that is greater than the housing width such that when the first and second loop edges are sealed to the first and second wall edges the loop is slack between the first and second wall edges and around a central belt portion; and wherein each of the first and second loop edges is characterized by a loop edge length, the loop edge lengths each essentially the same length as the wall edge lengths, the loop having a girth length about a central portion of the loop between the first and second loop edges that is greater than the loop edge lengths.

19. The apparatus of claim 18 further comprising a suction assembly and a vacuum, the suction assembly disposed inside the filter housing, the suction assembly including a header that defines a suction opening, the vacuum linked to the header for creating suction at the opening, the loop length and width such that a loop section adjacent the opening is slack when the vacuum is off and is sucked up against the header when the vacuum is on.

20. An apparatus for supporting a flexible filter belt loop, the loop characterized by a loop width between oppositely facing first and second loop edges, the apparatus comprising:

first and second oppositely facing housing walls characterized by first and second wall edges, respectively, each wall edge characterized by a wall edge length and formed so that one of the loop edges is sealable thereto;

at least one rigid crossmember linked to and between the first and second walls such that the distance between the wall edges defines a housing width and the space between the walls defines a filter chamber; and first and second band members for sealing the first and second loop edges to the first and second wall edges, respectively;

wherein each of the walls is centrally supported for rotation about a rotation axis and, wherein the apparatus further includes a suction assembly mounted inside the filter chamber that remains stationary during wall rotation, the suction assembly forming a suction opening and the filter felt loop being slack such that a portion of the filter belt loop covers the suction opening during suction assembly activation but is substantially spaced therefrom when the suction assembly is not activated.

21. A filter apparatus for separating liquid from solids in a tank, a liquid/solid mixture disposed in the tank in an amount such that the mixture rises to a mixture level within the tank, the apparatus comprising:

a housing formed about a filter chamber including first and second oppositely facing walls having by first and second wall edges, respectively, the walls separated by at least one crossmember, the filter chamber having a first volume;

a suction assembly including a header forming a single suction chamber having a second volume that is substantially less than the first volume, the header forming an opening that opens into the suction chamber, the assembly supported in the filter chamber and juxtaposed with the tank such that the opening is always below the mixture level and such that the suction assembly remains stationary during loop movement;

a filter loop having oppositely facing loop edges, the loop having first and second peripheral portions adjacent the loop edges, the first and second peripheral portions sealed against the first and second wall edges, respectively, and at least a section of the loop adjacent the opening at all times said filter loop being slack such that when a vacuum is applied to said filter chamber, a portion of said filter loop contacts said header to cover the opening thereof and when a vacuum is not applied, the filter loop portion is substantially spaced from said header;

a vacuum linked to the assembly for causing suction at the opening;

a motivator for moving the loop with respect to the opening; and a controller for controlling the vacuum and the motivator to periodically reduce the suction at the opening from the second to the first suction level and move the loop adjacent the opening so that different loop sections cover the opening at different times.

22. A filter apparatus for separating liquid from solids in a tank, a liquid/solid mixture disposed in the tank in an amount such that the mixture rises to a mixture level within the tank, the apparatus comprising:

a housing formed about a filter chamber including first and second oppositely facing walls having by first and second wall edges, respectively, the walls separated by at least one crossmember, the filter chamber having a first volume;

a suction assembly including a header forming a suction chamber having a second volume that is substantially less than the first volume, the header forming an opening that opens into the suction chamber, the assembly supported in the chamber and juxtaposed with the tank such that the opening is below the mixture level;

a filter loop having oppositely facing loop edges, the loop having first and second peripheral portions adjacent the loop edges, the first and second peripheral portions sealed against the first and second wall edges, respectively;

a vacuum linked to the assembly for causing suction at the opening;

a motivator for moving the loop with respect to the opening; and a controller for controlling the vacuum and the motivator to periodically reduce the suction at the opening from the second to the first suction level and move the loop adjacent the opening so that different loop sections cover the opening at different times;

wherein the housing walls are essentially circular, the suction header includes a screen across the opening, the screen has a semi-cylindrical shape and a screen arc is less than 120 degrees.

23. The apparatus of claims 21 wherein the first and second peripheral portions of the loop are completely sealed to the first and second wall edges, respectively.

24. The apparatus of claim 23 further including first and second bands secure the first and second peripheral portions of the loop to the first and second wall edges.

* * * * *